Aug. 22, 1933.  G. G. ANDREWS  1,923,699
BEAD BUILDING MACHINE
Filed June 11, 1931   9 Sheets-Sheet 1
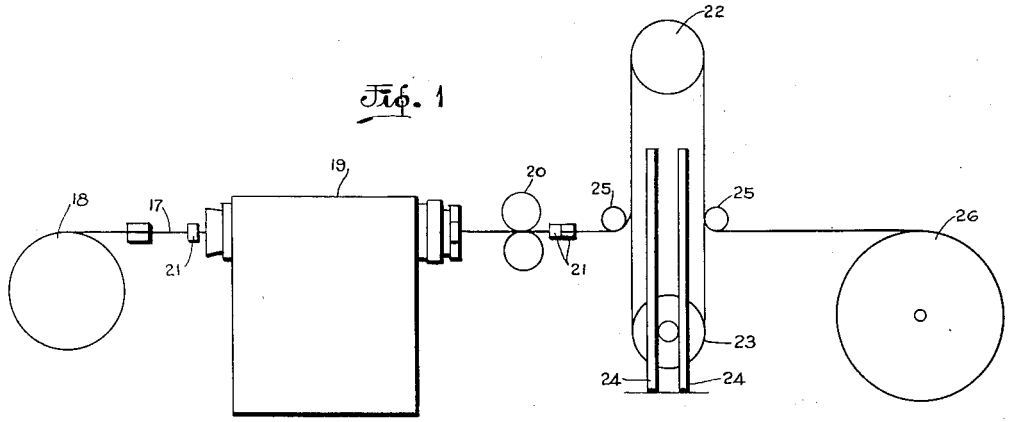
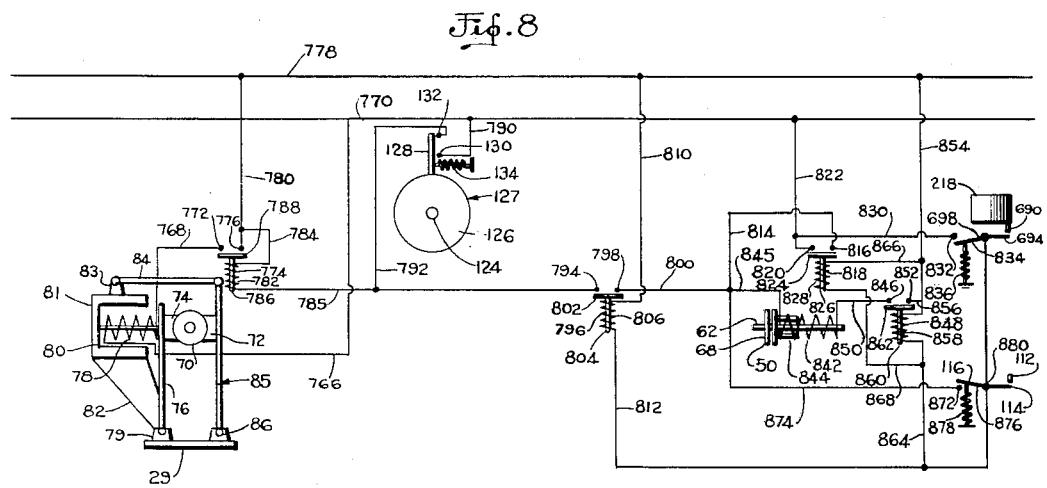
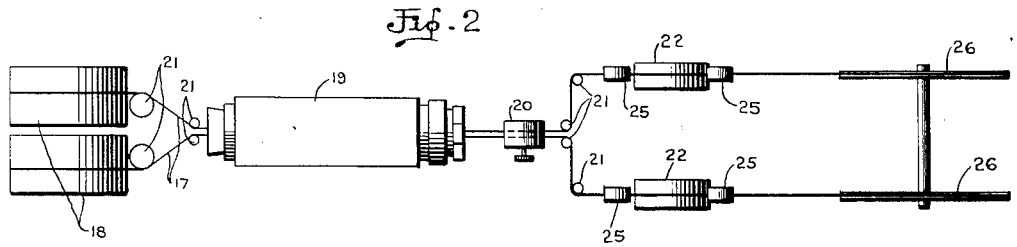
Inventor
George G. Andrews
By
Attorneys

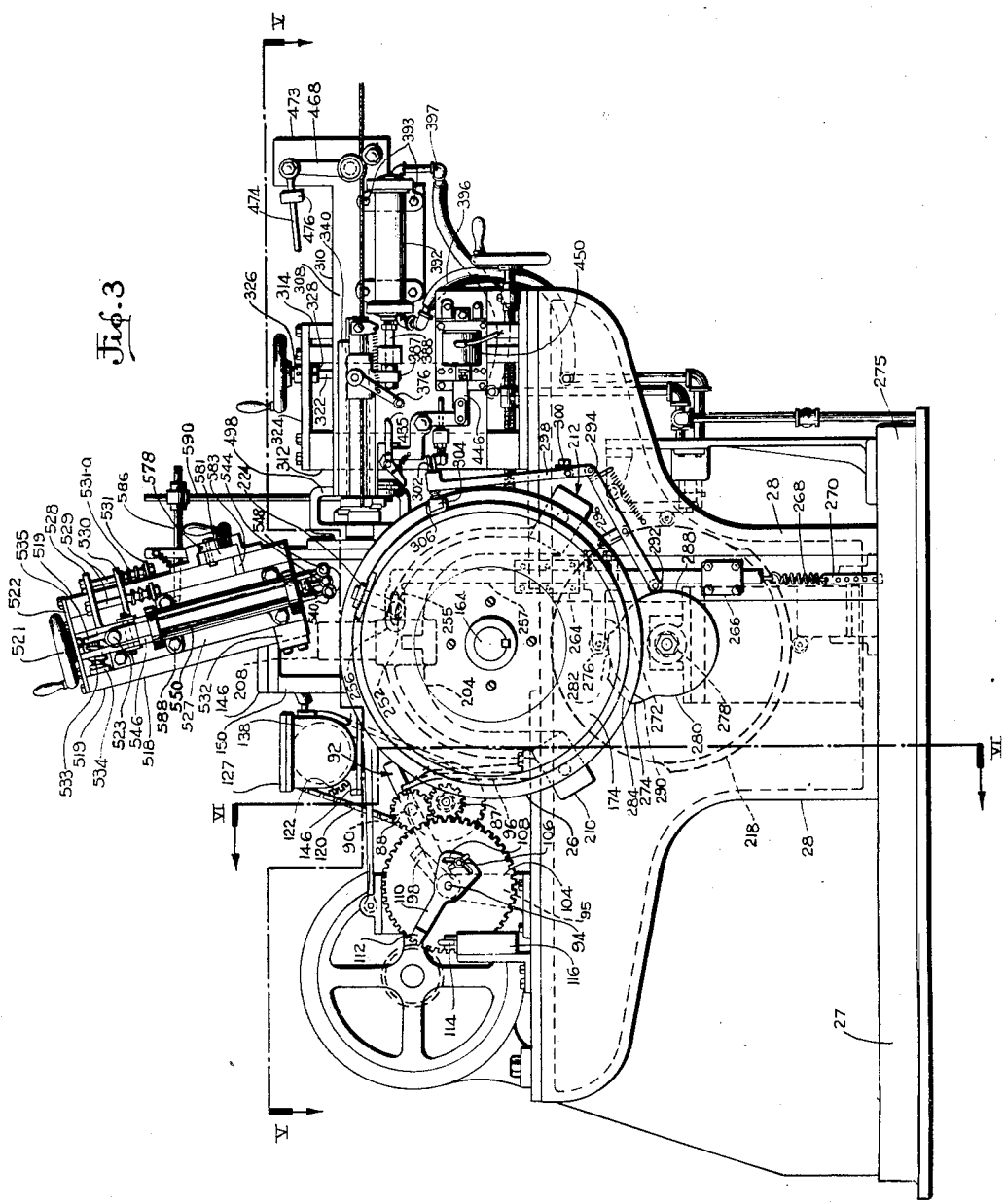

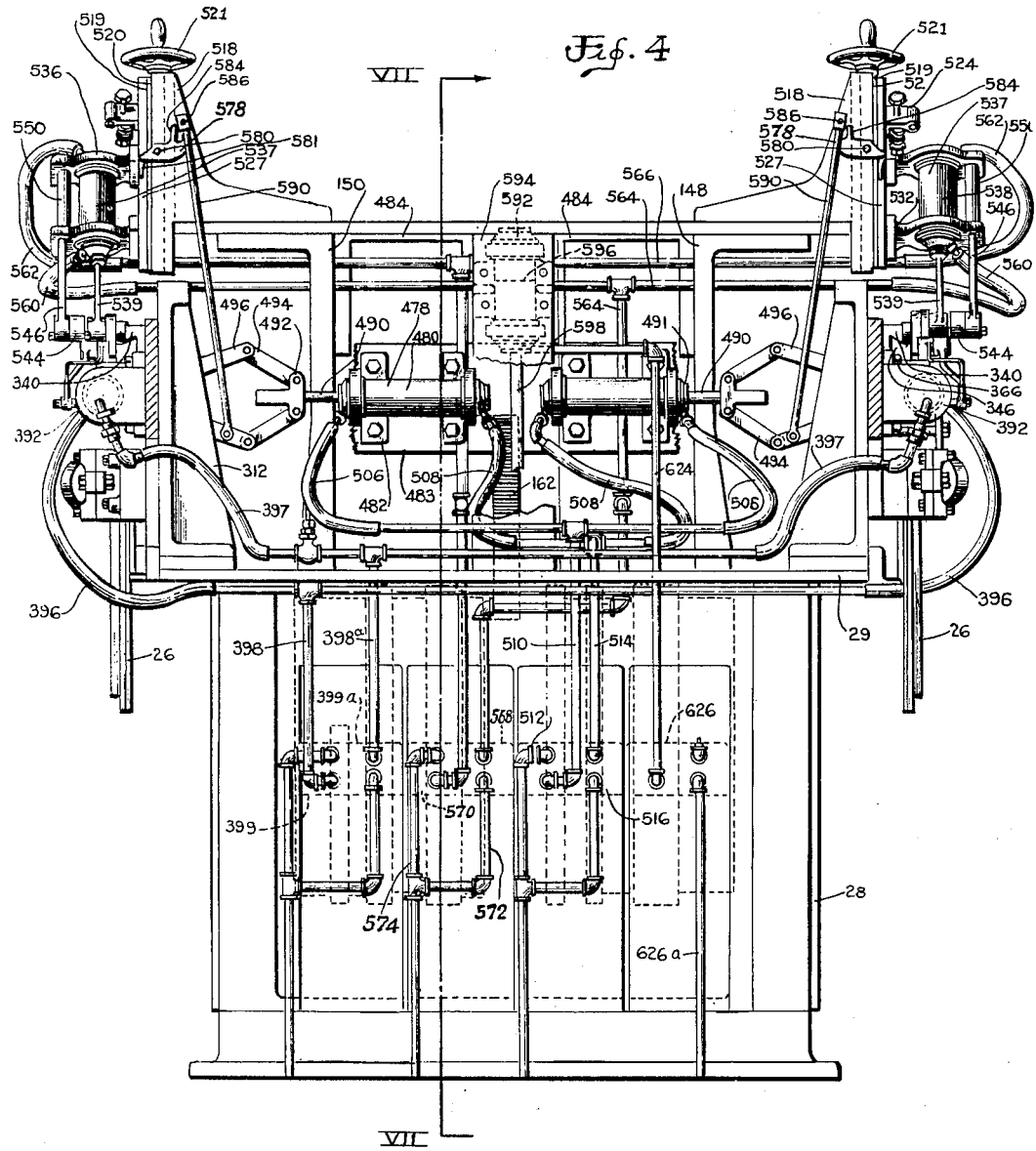

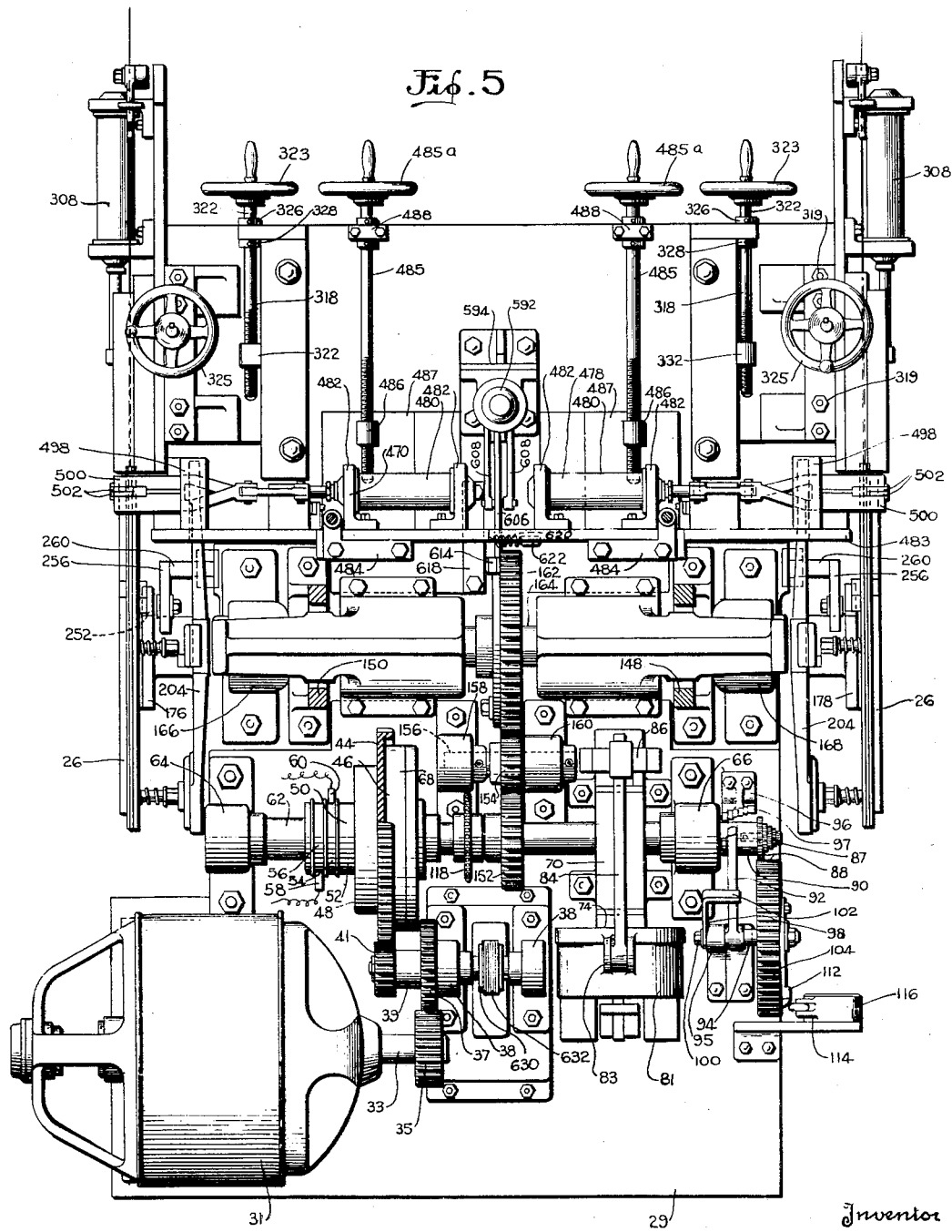

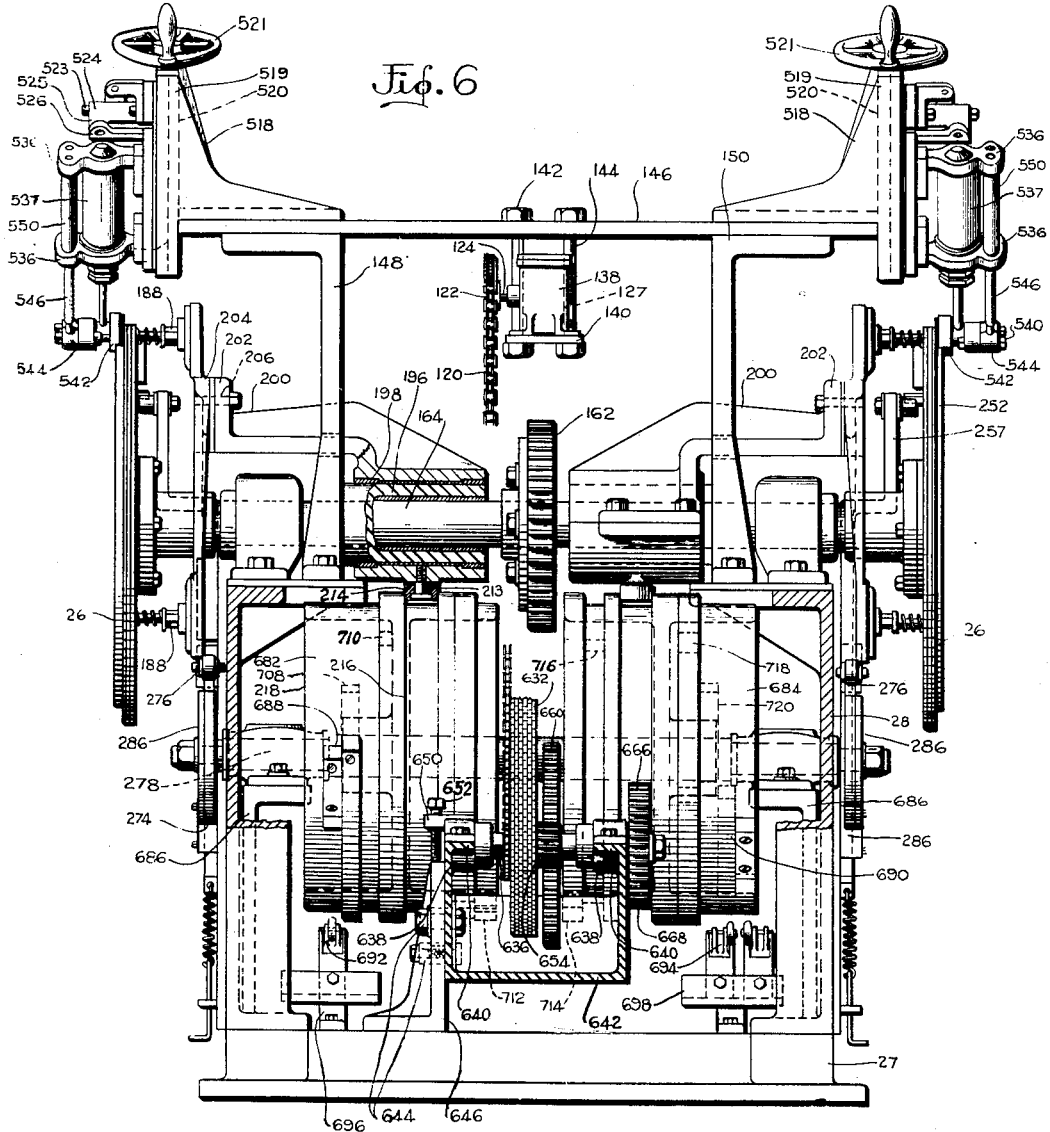

Aug. 22, 1933.   G. G. ANDREWS   1,923,699
BEAD BUILDING MACHINE
Filed June 11, 1931   9 Sheets-Sheet 6

Fig. 7

Inventor
George G. Andrews
By
Attorneys

Aug. 22, 1933.   G. G. ANDREWS   1,923,699
BEAD BUILDING MACHINE
Filed June 11, 1931   9 Sheets-Sheet 7

Inventor
George G. Andrews
By
Attorneys

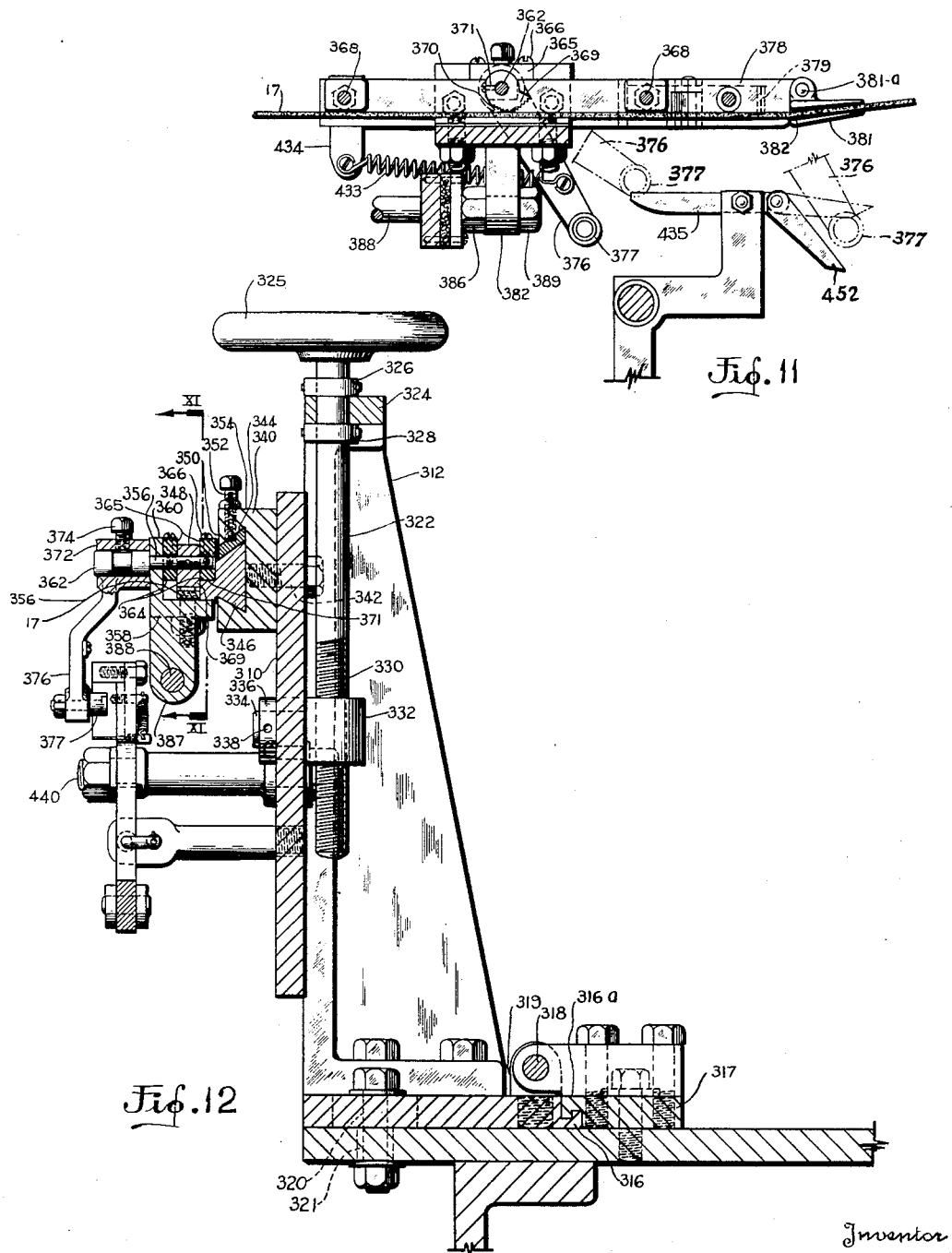

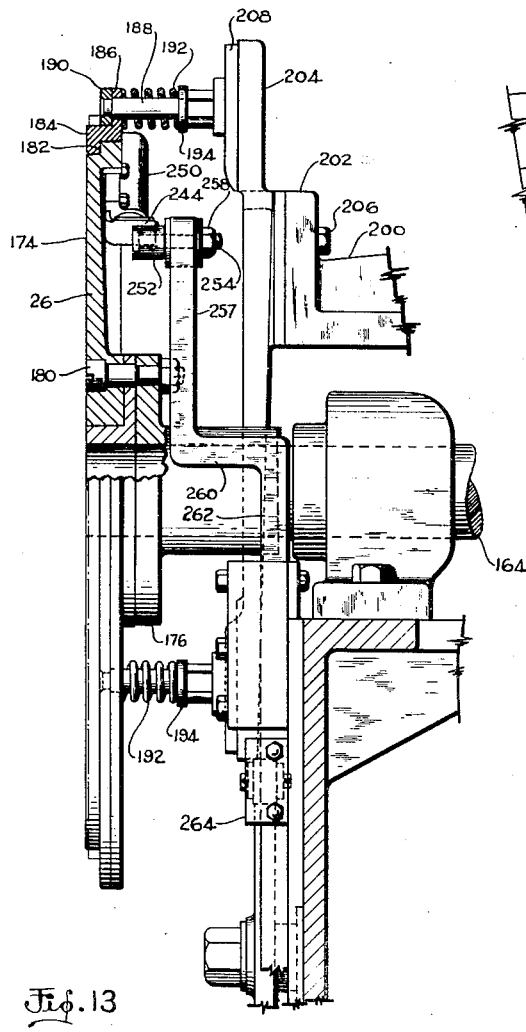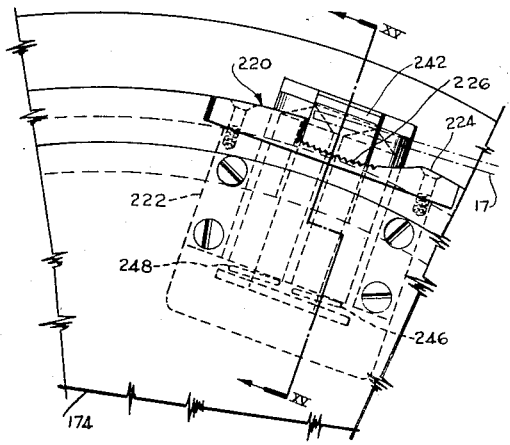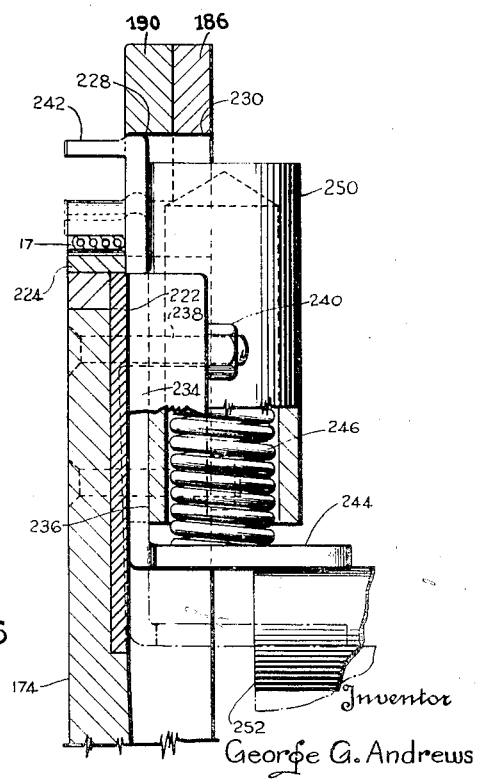

Patented Aug. 22, 1933

1,923,699

UNITED STATES PATENT OFFICE 1,923,699

BEAD BUILDING MACHINE

George G. Andrews, Akron, Ohio, assignor to The Goodyear Tire & Rubber Company, Akron, Ohio, a Corporation of Ohio Application June 11, 1931. Serial No. 543,606

46 Claims. (Cl. 154—9)

This invention relates to the manufacture of rings or grommets from strips of tape or similar material and it has particular relation to the manufacture from wire tape of inextensible bead rings or grommets for pneumatic tires.

The object of the invention is to provide a machine of the above indicated character in which the various operations of winding the tape upon the forming drum is accomplished automatically and without intervention of manual labor.

In the manufacture of pneumatic tires for vehicles, it is customary to incorporate inextensible rings or grommets of wire tape or similar material into the inner peripheries of the tires for the purpose of maintaining them upon the rims of the vehicle wheels. These bead rings are ordinarily manufactured by winding suitable lengths of tape upon a revolving drum of collapsible character. After the tape has been wound into position, the drum is collapsed and the rings formed thereon are removed and the ends of the tape are secured in position by means of a piece of adhesive tape.

In the machines which have heretofore been employed, the various steps of securing the end of the tape to the drum, rotating the drum, cutting the tape after a sufficient amount thereof has been wound thereupon and collapsing the drum for purposes of removing the bead have been performed by manual labor. Obviously, this manual labor was relatively expensive and the output of the machines was limited by the speed of the workmen employed in operating them.

This invention contemplates the provision of a machine for manufacturing bead tapes in which the various steps of securing the end of the tape to a revolving drum, initiating rotation of the drum, severing the tape after the completion of the step of winding it, and removing the completed rings from the drums are automatically performed in synchronism with each other.

For a better understanding of the invention, reference may be had to the accompanying drawings, forming a part of this specification, in which:

Fig. 1 is a diagrammatical elevational view of the general layout of the various devices employed in practicing the invention;

Fig. 2 is a diagrammatical plan view of the layout shown by Fig. 1;

Fig. 3 is a side elevational view of mechanism employed for forming bead building material into bead rings;

Fig. 4 is an end elevational view of the device shown in Fig. 1;

Fig. 5 is a cross-sectional view taken substantially along the line V—V of Fig. 3, portions of the mechanism being shown as a plan view;

Fig. 6 is a cross-sectional view taken substantially along the line VI—VI of Fig. 3, portions of the mechanism being shown in elevation;

Fig. 7 is a cross-sectional view in which certain parts are broken away taken substantially on the line VII—VII of Fig. 4;

Fig. 8 is a wiring diagram of an electrical circuit employed in controlling operation of the bead forming drum;

Fig. 11 is a fragmentary view, on a larger scale, disclosing in detail the device for gripping bead building material while it is being fed to a drum;

Fig. 12 is a cross-sectional view, on a larger scale, taken substantially upon the line XII—XII of Fig. 9;

Fig. 13 is a fragmentary view, partially in elevation and partially in cross-section of a bead forming drum and its supports;

Fig. 14 is a fragmentary elevational view of a clamp employed for securing the bead building material to the surface of the drum; and Fig. 15 is a cross-sectional view, on a larger scale, taken substantially upon the line XV—XV of Fig. 14.

Figure 9:
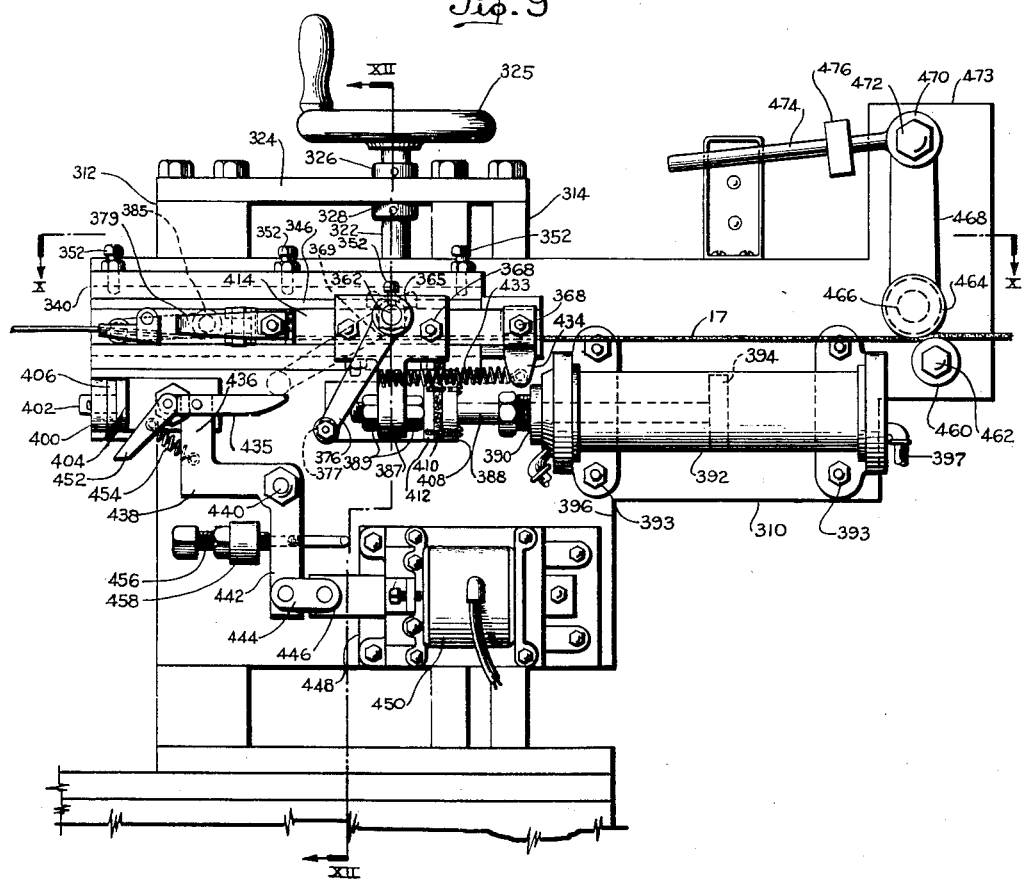
Fig. 9 is a fragmentary elevational view showing in detail mechanism employed for purposes of feeding the end of a bead building material to a drum.
Figure 10:
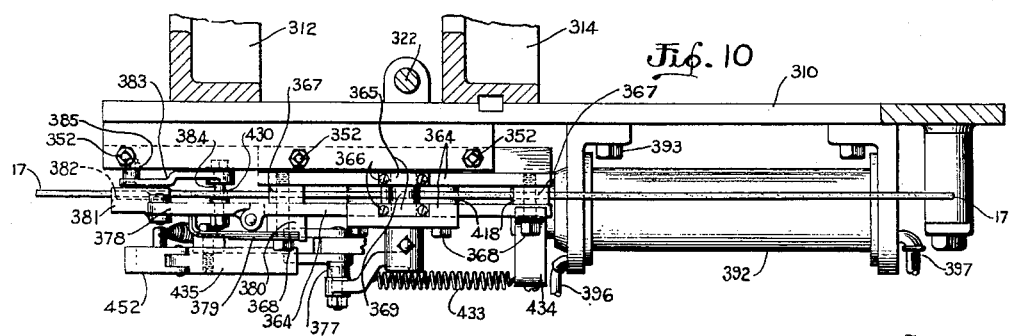
Fig. 10 is a fragmentary cross-sectional view taken substantially on the line X—X of Fig. 9.

As shown in Figs. 1 and 2, bead building material, such as a pair of bead tapes 17, of conventional construction are drawn from a pair of creels 18 through a tubing unit 19 which applies a coating of rubber compound thereto. The operation of drawing the tapes through the unit is effected by means of rollers 20 which are driven by any convenient source of power, such as an electrical motor (not shown). Each tape is trained about an individual set of vertical guide rollers 21 which directs it to individual festooning devices having vertically spaced storage rollers 22 and 23, the latter of which may be mounted in vertical guides 24 in such manner that excess supply of tape may be accumulated between the rollers by the separation of the latter and then withdrawn at will by pulling upon the tape to cause the roller 22 to approach the roller 23. Tape is directed to and from the festooning devices by means of horizontal guide rollers 25 under which it is directed. The tape is also intermittently wound upon the drums 26 to form beads.

The bead forming unit comprises a base 27 provided upon its upper surface with a housing 28 which encloses certain mechanism which will be described later. As best shown in Fig. 5, the top 29 of this housing constitutes a table or support for a motor 31, the shaft 33 of which has a pinion 35 keyed thereto. This pinion engages a gear 37, which is keyed upon a shaft 39, having bearings 38 upon the top 29 and which has, upon one of its extremities, a pinion 41 that engages a gear 44. This gear is formed integrally with a disc 46 which, in turn, is secured to a housing 48 of a magnetic clutch 50. A projecting hub 52 of this clutch is provided with a pair of slip rings 54 and 56 which respectively engage carbon brushes 58 and 60 that constitute means for supplying electrical current for energizing the clutch. The clutch is of conventional construction and the internal mechanism thereof will be described later in somewhat greater detail in connection with the description of the wiring diagram.

The hub 52 is rotatably mounted upon a shaft 62, which is journaled in bearings 64 and 66 which are mounted upon the table 29. The second or mating portion 68 of the clutch 50 is keyed to the shaft 62 in such manner as to impart rotational movement thereto when the clutch is so energized as to bring the portions 46 and 68 into engagement with each other.

As best shown in Figs. 5, 7 and 8, the shaft 62 is also provided with a brake drum 70 which is engaged by shoes 72 and 74 of a magnetic brake mechanism 75 which operates to arrest the motion of the shaft when the clutch portions 46 and 68 have been disengaged. The shoe 74 is rigidly secured to an armature 76, best shown in Fig. 8, which is mounted for swinging movement between spaced brackets 79 upon the table 29 in front of a solenoid 78. The armature is also engaged by a spring 80 that bears, at one end, against the rear of a housing 81 for the solenoid in such manner that the armature is normally urged toward the drum. The housing is also provided with a downwardly extending bracket 82 which is pivoted to the bracket 79 and an upwardly extending lug 83, formed upon the upper portion of the housing, is pivotally attached to a horizontal rod 84. The rod is also pivoted to a vertically disposed link 85 that supports and operates the brake shoe 72 and which is pivoted at its lower end to a bracket 86 upon the table 29.

In the operation of the brake, the solenoid is normally energized thus retracting the armature from the drum and drawing the housing 81 forward against the pull of the spring 80. This movement in turn actuates the lug 83 to move the rod 84 and thereby so swinging the upper end of the link 85 as to release the brake shoe 72 from engagement with the drum 70. De-energization of the solenoid permits the spring 80 to press the armature 76 and the housing 81 apart to bring the brake shoes into engagement with the drum.

The extremity of the shaft 62 projecting from the bearing 66 is provided with a series of gears 87, shown in Figs. 3 and 5, of graduated sizes which are mounted upon the shaft in stepped relation with respect to each other. These gears may be selectively engaged by means of a gear 88 (see Figs. 3 and 5) which is mounted upon a stud shaft 90. This stud shaft is secured intermediate of the end of an arm 92, which is slidably and rotatably mounted upon a horizontally extending shaft 94 that is rigidly secured within an opening in a bracket 95. For purposes of supporting the swinging extremity of the arm 92 and for maintaining the gear 88 in engagement with any predetermined gear 87, an upwardly extending bracket 96 is mounted upon the table 29. The upper end of this bracket is formed with a series of notches 97 constituting steps in which the end of the lever 92 is adapted to rest.

A clamping arm 98 (see Fig. 5) is rotatably mounted upon the extremity of the shaft 94 upon the opposite side of the bracket 95 from the arm 92 and may be clamped in any predetermined position of adjustment by means of a nut 100 threaded upon the end of the shaft 94. The outer extremity of the arm 98 is provided with a laterally projecting portion 102, which is adapted to bear upon the upper face of the arm 92 whereby to maintain the latter in any predetermined notch upon the bracket 96. The gear 88 engages and drives a switch operating gear 104 which is journaled upon the shaft 94 and which, as shown in Fig. 3, is provided with a laterally extending bolt 106 that projects through an arcuate slot 108 formed within a cross arm 110. This arm is journaled upon the shaft 94 in such manner as to rotate with the gear 104, and is provided upon the extremity opposite to the slot 108 with a cam lug 112 that actuates the arm 114 of an elevator door switch 116 of conventional design. The switch is so connected with the magnetic clutch 50 and the magnetic brake mechanism as simultaneously to operate these elements at predetermined points in the cycle of operation of the machine to release the clutch and actuate the brake to stop the rotation of the drums 26. The details of the operation of this circuit will be described completely at another time.

The shaft 62 is further provided intermediate of its length with a sprocket gear 118 having a sprocket chain 120 trained thereabout. The sprocket chain is also trained about a second sprocket gear 122, shown in Figs. 3 and 7, which is mounted upon a shaft 124. As shown in Figs. 6 and 8, the shaft supports and drives a disc 126 of a carpenter relay 127 of conventional design. This disc 126 in turn engages a contact member 128 and serves during rotation of the mechanism to maintain the latter out of engagement with a pair of electrical contact points 130 and 132. The contact member is urged toward the contacts by means of a small tension spring 134 which, upon substantial stoppage of the machine, overcomes frictional engagement between the disc 126 and the member and thus closes the gap between the contacts, thereby energizing the brake mechanism 70 to release the brake shoes from the drum.

As shown in Figs. 6 and 7, the mechanism constituting the relay is mounted within a housing 138, which is secured to a bracket 140, projecting from the lower extremities of a pair of bolts 142 and 144. These bolts in turn project through openings within a horizontally disposed cross bar 146 which is secured upon the upper extremities of a pair of spaced brackets 148 and 150 of inverted U-shape that are mounted upon the table 29. A gear 152, shown in Fig. 5, mounted upon the shaft 62 between the sprocket gear 118 and the drum 70, engages an idler gear 154 which is keyed upon a shaft 156 which is rotatably mounted within spaced bearings 158 and 160, that are mounted upon the table 29. The gear 154, in turn, serves as a driving means for a bull gear 162, which is keyed upon the main shaft 164 of the machine.

The shaft is journaled within bearings 166 and 168 (see Fig. 5) that are supported upon the table 29 and opposite extremities project between the branches of the U-shaped brackets 148 and 150 and support the revolving bead forming drums 26. Since these are of identical construction, a detailed description of one is sufficient for both. As shown in Fig. 13, each drum comprises a disc 174 which is secured upon a head 176 of the shaft 164 by means of through bolts 180. The outer periphery of the disc is formed with a step or shoulder 182 constituting a seat for a mating internal shoulder upon an adapter ring 184. These rings are so constructed that rings of different external diameters may be used interchangeably for purposes of forming beads of various diameters.

The adapter rings have outwardly projecting flanges 186 which are provided with openings for the reception of longitudinally reciprocable bolts 188, having their extremities secured within corresponding openings within a bead ejecting ring 190 mounted for reciprocation upon the adapter ring 184. Upon the side of the flange 186 opposite to the ring 190, the bolts 188 are provided with coil springs 192 that engage collars 194 also mounted upon the bolts 188 in such manner that the rings 190 are normally maintained in contact with the flange 186.

For purposes of reciprocating the bolts 188 and the attached rings 190, a pair of sleeves 196, shown in Fig. 6, are mounted upon the shaft 164 and rigidly secured to the standards 148 and 150. These sleeves in turn have outer collars 198 that support laterally projecting brackets 200 slidably but non-rotatably mounted thereupon. The extremities of the brackets are formed with flanges 202, which in turn have members 204 of inverted U-shape secured thereto by means of through bolts 206. Each member 204 is provided at its median portion with an upwardly extending bracket 208, shown in Fig. 3, which is adapted to engage the rear extremity of one of the bolts 188 when the drum 26 is brought to rest. The extremities of the member 204 likewise are provided with laterally projecting flanges 210 and 212 which engage the remainder of the bolts 188. For purposes of reciprocating the collar 198 upon the shaft 164, a stud bolt 213, shown in Fig. 6, is secured to the collar upon the lower side thereof and a cam roller 214 is journaled thereupon. This roller in turn engages a sinuated cam groove 216 formed in the outer periphery of a cam drum 218, a detailed description of which is for the present deferred.

As best shown in Figs. 14 and 15, the end of a bead tape 17 at the beginning of the operation of winding it upon the drum 26 is clasped by means of an automatically operated clamp 220 that comprises a plate 222 which is secured to the rear face of the disc 174 adjacent to the periphery thereof and which has a flange 224 disposed within a notch formed within the outer periphery of the disc. A serrulated notch 226 formed in the flange is adapted to receive the end of the tape. For purposes of retaining the end of the tape in the notch, the flange 186 and the ring 190 are formed with mating openings 228 and 230 at their inner peripheries, that receive a clamping member comprising a stem portion 234, mounted for reciprocation in a radial direction with respect to the disc 174 upon the rear face of the plate 222. The member operates within a groove formed in a plate 236, which is secured upon the plate 222 by means of bolts 238 extending through the disc 174 and the plate and having clamping nuts 240 threaded upon the ends thereof.

The upper or outer end of the member 234 is provided with a forwardly projecting shank 242 which extends through the opening 228 in position to engage the upper surface of the end of a bead tape. The lower end of the member 234 is also provided with a similar rearwardly projecting shank 244 which is engaged by and urged radially inwardly by means of springs 246 and 248, that are housed within cylindrical bores formed in a member 250 secured to the rear face of the member 236.

Reciprocation of the member 232 is automatically effected by means of a cam roller 252 which is mounted upon a stud bolt 254 in such manner as to engage the lower face of the shank 244. As shown in Figs. 3 and 13, the bolt 254 is adjustably mounted in an elongated opening 255 formed in a shank 256 upon the extremity of an upwardly extending bar 257 and is maintained in position within the opening by means of a threaded nut 258.

The bar is also formed with a horizontally inwardly directed offset portion 260 shown in Figs. 3 and 13 which is integrally secured to an upwardly directed portion 262 that reciprocates within guides 264 and 266 which are secured to the side of the housing 28. At its lower end, the bar is attached to a tension spring 268 which in turn is secured to an upwardly extending bracket 270 upon the base 27. At a point intermediate of the guides 264 and 266, an arm 272 is secured to the bar 257 and projects rearwardly in parallel relation with respect to the housing 28 into engagement with an operating cam 274 which imparts reciprocatory motion thereto and thus actuates the bar. For the purposes of preventing excessive friction between the surface of the cam, and the arm 272, a roller 276 may conveniently be mounted upon the end of the arm in such manner as to engage the surface of the cam. The cam 274 in turn is mounted upon the projecting end of the driven shaft 278 of the cam drum 218 which has previously been referred to.

The cam 274, is provided with a substantially circular portion 280 over which the roller 276 rides during the operation of winding the tape upon the drum. At the conclusion of the latter operation, the roller engages a slightly offset portion 282 which elevates the roller to reciprocate the bar 257 and thus actuates the member 234 and slightly elevates the member 242 thereby releasing the end of the tape 17. Immediately adjacent to the offset portion 276, the cam is formed with a second portion 284 which at a predetermined point in the cycle of operation further elevates the member 242 to permit the convenient insertion of the end of the bead tape.

A second cam 286 shown in Fig. 6 is disposed upon the shaft 278 in side by side relation with the cam 274 and comprises a circular portion 288 and an offset portion 290 also circular but of greater diameter. This cam engages a roller 292 (see Fig. 3) which is rotatably mounted upon a lever 294, having a pivotal connection intermediate of its ends to a link 296, which in turn is pivoted to the housing 28. The remote end of the lever 294 is pivoted to the end of a second lever 298 which is pivoted intermediate of its end to a bracket 300 also upon the side of the housing 28. The upper end of the lever 298 is bored to receive a screw threaded bolt 302 that projects forwardly and adjustably supports a head 304 having an oiling pad or felt 306 secured thereto. By proper adjustment of the bolt 302, this pad may be caused to contact with the surface of the drum during that portion of its revolution that the roller 292 engages cam surface 290 to apply a film of oil or other non-adhesive fluid thereto for purposes of preventing adhesion between the surface of the drum and the rubberized bead tape which is disposed thereupon.

Wire tape for the formation of the beads may be advanced into contact with the drum and the end thereof disposed beneath the shank 242 of the clamp by means of a convenient feeding mechanism shown in Figs. 3, 9, 10, 11 and 12 and indicated generally by the numeral 308. This mechanism comprises a plate 310 which is secured to the outer face of a pair of vertically disposed standards 312 and 314 upon the upper face of the table 29, by means of bolts 315 (best shown in Fig. 7) that extend through vertically disposed slots 315a formed in the standards 312 and 314 previously alluded to.

As shown in Fig. 12, these standards are slidably disposed upon the table and are guided in their movement by means of guide flanges 316 which engage mating flanges 316a upon guide brackets 317 also upon the surface 29. The standards are actuated by means of screws 318 which are provided with handwheels 323 and which are threaded through the brackets 317 and engage brackets 319 upon the standards. The latter may be clamped in any desired position by means of bolts 320 in slots 321 in the supporting member 29. Vertical adjustment of the plates 310 may conveniently be effected by means of vertical shafts 322 which extend through cross bars 324 interconnecting the standards 312 and 314. These shafts are provided with handwheels 325 and are maintained from vertical displacement within the openings in the bars by means of collars 326 and 328 rigidly secured to the shaft 322 respectively upon the upper and lower faces of the bars 324.

The lower ends of the shafts 322 are provided with threaded portions 330 which extend through correspondingly bored and threaded brackets 332 which have shanks 334 extending through the plates 310. These shanks are secured from longitudinal displacement from the openings within the plates by means of collars 336 which in turn are secured in position by cotter pins 338 that extend transversely through both the collars and the shanks.

The outer faces of the plates 310 have horizontally disposed guide plates 340 secured thereto by means of stud bolts 342 that extend through openings within the plates and into corresponding openings within the guide bars 340. The plates 340 are formed with guide grooves 344 of trapezoidal cross-sectional contour that receive mating portions 346 of slides 348. In order to insure a close and accurate fit between the sides of the grooves 344 and the mating portions 346, bearing strips 350 are disposed adjacent to the upper face of the groove and are adjustably maintained in contact with the upper face of the portion 346 by means of set screws 352 extending through the portions 354 of the bars 340. One branch of an angle plate 358 is secured to the lower face of each slide 348 in such manner that the upper branch 360 thereof projects upwardly in parallel relation with respect to the vertical face of the slide 348 to form a groove 356 which receives the tape 17. This branch 360 constitutes a journal for a transversely extending shaft 362. The shaft is also journaled in bearings in spaced plates 364 and is maintained from displacement from the bearings by means of cover plates 365 which are secured in position by means of set screws 366. The plates 364 are maintained in spaced relation by means of washers 367 upon bolts 368, by means of which the plates are secured to the slide 348. Bead tape may be clamped in the groove 356 by means of a cam 369 having a serrated cam surface 370 best shown in Fig. 11. This cam is rigidly secured to the shaft 362 by means of a set screw 371 which extends transversely therethrough.

For purposes of operating the cam, the outer extremity of the shaft 362 is provided with a collar 372 which is adjustably locked thereto by means of a set screw 374. This collar, in turn, is provided with a forwardly and downwardly directed arm 376 having a cam roller 377 mounted thereupon at the extremities thereof. The operation of the roller will be described later.

A second plate 378 hingedly connected to the forward end of the outer of the plates 364 in such manner that it can be swung outwardly from the slide 348, is normally resiliently maintained in alignment therewith by means of a leaf spring 379 which bears thereagainst. The spring in turn is mounted upon a block 380 which is disposed upon the foremost of the bolts 368. Upon the forward end of the plate a head 381 is mounted to swing about a horizontal axis 381a as shown in Fig. 11 and is provided with a guide slot 382 for the bead tape. The tape is maintained from displacement from the slot by an arm 383 hingedly mounted upon a bolt 384 which projects laterally from the plate 378. The arm is maintained in position to prevent displacement of the tape by means of a roller 385 which is mounted thereupon but which normally rides in the groove 344 in the bar 340. As shown by broken lines in Fig. 9, when the slide 348 is in forward position, this roller travels upwardly upon the flange 186 upon the drum 26. It will also be observed that the hinged connection between the plates 364 and 378 permits the latter members to be swung aside thus withdrawing the end of the roller 385 from the groove 344 to permit it to drop so that the bead tape 17 may be readily inserted in or removed from the slot 382.

The slides 346 may be reciprocated by means of a downwardly projecting lug 387 formed upon each of the angle plates 358. This lug is rigidly secured to a piston shaft 388 that projects therethrough by means of lock nuts 389. The rod extends rearwardly through a stuffing box 390 into a cylinder 392 attached to the plate 310 by means of bolts 393 and the rear end of the piston rod is attached to a piston head 394 which is slidably mounted for the cylinder. Fluid under pressure for purposes of actuating this piston may conveniently be supplied to the cylinder by means of flexible hose connections 396 and 397 disposed at opposite ends thereof and connected by means of conduits 398 and 398a shown in Fig. 4 to inlet and exhaust valves 399 and 399a.

As best shown in Fig. 9 the forward travel of the piston rod 388 is limited by means of a stop comprising a lug 400 secured to the side of the plate 310 in the path of the rod. For purposes of cushioning the impact of the end of the rod against this stop, the latter is bored to receive a shank 402 secured to a movable plate 404, which is separated from the lug 400 by means of a washer 406 of felt, rubber, or other convenient cushioning material. If desired, the rod may also extend through a second lug 408 upon the side of the plate 310 which acts as a stop to limit rearward movement of the rod. Impacts against this lug are also cushioned by means of a layer 410 of rubber or felt which is disposed between the lug and a plate 412 which is adapted to contact with the rear face of the lock nut 389.

The lever 376 which operates the cam 369 is normally held in elevated position to maintain the cam 369 out of contact with the bead tape 17 by means of a dog 435 which projects substantially in a horizontal plane. A spring 433 secured between the lever 376 and a lug 434 on the plate 364 tends to move the lever 376 to operate the cam 369 to clamp the bead tape 17 in place. When in retracted position, the slide 348 is so disposed that the roller 377 upon the end of the lever 376 rests upon the rear extremity of the dog. For purposes of tripping the dog and thus permitting the end of the lever 376 to drop to bring the cam 369 into contact with the bead tape, the dog is secured to an upwardly extending projection 436 upon a bell crank lever 438. The latter is journaled upon a shaft 440, which in turn is secured within an opening extending through the plate 310.

The lower extremity 442 of the lever is pivotally attached to the link 444 which serves pivotally to connect it to a magnetic plunger 446. The latter extends between guides 448 and its rear end is disposed for reciprocatory motion within a solenoid 450. This solenoid when energized by the admission of electrical current, retracts the plunger 446 and thus operates the bell crank 438 to move the dog 435 and thus to release the lever 376. The lever when freed, swings downwardly under the pull of the spring 433 to cause the cam 369 to grip the bead tape in such manner that when the piston 392 is reciprocated, the tape is drawn forwardly and the end thereof is thrust under the clamp 220. After the bead tape has been thrust under the clamp and upon the rearward movement of the piston, the lever 376 is elevated to release the cam 369 by means of a pawl 452, which is pivoted to the rear end of the dog 435 in such manner as to engage the roller 377 and thus to guide the latter onto the dog upon the return movement of the piston. The pawl is maintained in depressed position by means of a tension spring 454, which is attached to the pawl and to a portion of the member 436. The path of movement of the extremity 442 of the bell crank lever 438 may conveniently be limited by means of a set screw 456, which is threaded within a lug 458 in the path of the lever.

In order positively to prevent the retraction of the end of the bead tape from the building drum, a guide roller 460 is secured adjacent to the rear extremity of the plate 310 upon a stud bolt 462. Bead tape, in passing to the building drum, is held in contact with this roller by means of a second roller 464 which is journaled upon a stud bolt 466 in the lower extremity of a lever 468. This lever in turn is provided, at its upper extremity, with a bearing 470 which rotates upon a shaft 472, secured to a bracket 473 upon the plate 310. In order to increase the pressure between the rollers 464 and 460, an arm 474, having an adjustable counterweight 476, is secured to the bearing 470 in such manner as to rotate the arm 468 and thus to cause the roller 464 to move toward the roller 462. It will be evident that when a retractive force is exerted upon the tape, the force is transmitted to the movable roller 464 and thus causes the latter firmly to press the tape against the roller 460.

After a sufficient length of tape has been wound upon a drum 26 to form a bead, the portion thus wound upon the drum may conveniently be severed from the remaining tape by means of shear mechanisms 478, best shown in Figs. 4 and 5. These mechanisms comprise cylinders 480 for fluid under compression which are secured in position by means of brackets 482 disposed at the ends thereof. The brackets in turn are bolted to a transversely extending bar 483 mounted upon standards 484, which, at their lower extremities, are slidably disposed upon the table 29. The standards may be moved forwardly or rearwardly into a desired position of adjustment by means of screws 485 that are threaded into brackets 486 upon the bases 487 of the standards. The unthreaded ends of the screws are journaled in bearings 488 upon the table 29. Handwheels 485a are provided on the ends of the screws 485. Cylinders 480 house reciprocating pistons (not shown) which are attached to the rear extremities of piston rods 490, that extend outwardly through stuffing boxes 491 and the forward extremities thereof are provided with cross heads 492 having toggle links 494 pivoted thereon. As shown, these links, in turn, are hingedly connected to the rear extremities of levers 496 which, intermediate of their ends, are pivoted between the sides of brackets 498 constituting closed rectangular loops attached to the extremities of the bar 483. The free extremities 500 of these levers are provided with shear blades 502, the surfaces of which are adapted to glide over each other to sever the tape.

For the purpose of actuating the pistons in cylinders 480, conduits 506 and 508 shown in Fig. 4 are respectively connected to the forward and the rear ends of the cylinders in such manner as to supply fluid under compression thereto. Conduits 506, connect with a common conduit 510 which leads to a valve mechanism 512, and a similar conduit 514 connects the conduits 508 with a valve 516. These valves are controlled by means of suitable cams upon the cam drum 218. The mechanism for effecting this purpose will be described in detail later.

A mechanism for stitching bead tape to the surface of the drum comprises upwardly extending brackets 518 (shown in Figs. 3, 4, 6 and 7) which are attached to the cross bar 146. These brackets are provided with guides 519 between which a slide 520 is mounted. This slide may be longitudinally adjusted between the guides by means of a screw 521 journaled in a bar 522 which interconnects the guides and which, at its lower extremity, is threaded into the slide. A horizontal shaft 523 upon the upper end of the slide has a sleeve 524 journaled thereupon and a downwardly extending bracket 525 upon this sleeve has a vertically swingable arm 526 pivoted thereto and the end thereof supports a plate 527. The sleeve is further provided with a laterally extending bracket 528 (best shown in Fig. 3) having downwardly projecting bolts 529 extending therethrough. The bolts also extend through a second laterally extending bracket 530 upon the plate 527 and the lower extremities thereof are provided with collars 531. Coil springs 531a under compression upon the bolts engaging the collars 531 and the bracket 530 maintain the plate 527 resiliently in contact with the face of the slide 520. The plate is also urged into contact with a limit stop 532 upon the rear of the guides 519 by means of a coiled spring 533 under compression between a lug 534 upon the previously mentioned guide and corresponding lug 535.

The plate 527 is provided with spaced brackets 536 which support a cylinder 537 for fluid under compression. This cylinder contains a slidable piston (not shown) which is rigidly attached to a piston rod 539 that projects downwardly through the lower end of the former. The lower extremity of the rod is formed with a bearing, for the shaft 540 of a stitcher roller 542. In order to support the shaft and prevent it from buckling upon the stitcher roller coming into contact with the surface of a building drum 26, the end of the shaft 540 is provided with a cross head 544 which is attached to slide rods 546 by means of bolts 548. The upper extremities of these rods extend through openings within the lower of the brackets 536 into tubes or cylinders 550 constituting guides therefor.

In order to actuate the piston mechanism and thus bring the roller 542 into contact with a building drum 26 the cylinder 537 is connected at opposite ends with flexible conduits 560 and 562. The latter are connected by means of conduits 564 and 566 shown in Fig. 4 with valves 568 and 570 that in turn are connected to a source of fluid under compression by means of conduits 572 and 574. The valves 568, like the valves 516, are controlled by means of the cam mechanism upon the drum 218. Description of such mechanism is for the present deferred.

In order to prevent rotation of the plate 527 about the shaft 523 upon the admission of fluid under compression to the upper end of the cylinder 537 during normal rotation of the drums 26, a latch 578 (shown in Figs. 3 and 4) is pivoted upon the side of the bracket 518 by means of a bolt 580. This latch is provided with a downwardly extending arm 581 having a rearwardly extending lug 583 (shown in Fig. 3). This lug normally engages the edge of the plate 527 in such manner as to prevent rotation of the latter about the shaft 523. The rear end of the latch is formed with an upwardly extending bifurcated portion 584 which embraces a substantially horizontal rod 586. The latter is pivoted upon a bolt 588 (see Fig. 3), which is supported by the bracket 518 in such manner that downward movement of the outer or free extremity of the rod 586 depresses the end of the latch 578 and thus swings the member 583 forwardly and out of engagement with the plate 527. The rod 586, in turn is actuated by means of a link 590 secured thereto and attached at its lower end to one of the levers 496 in such manner that upon actuation of the pistons in the cylinders 480 to sever the bead tape, the latch 578 is depressed thus to release the member 583 from the plate 527.

As shown in Figs. 4, 5 and 7 positive stoppage of the drums 26 at such points in their rotation as to bring the clamping mechanism 220 into alignment with respect to the bead tape guide 381 is effected by means of a suitable mechanism termed a "back-up mechanism." This device comprises a cylinder 592 which is bolted to an upwardly extending bracket 594 attached to the table 29. The cylinder has a conventional piston 596 mounted therein which is secured to the upper end of a downwardly projecting piston rod 598 that extends through a stuffing box 600 upon the lower end of the cylinder. The rod also extends through a supporting guide 602 and is attached at its lower end to a link 604 which is pivoted upon the end of a take-up lever 606. This lever is pivoted intermediate of its ends upon parallel brackets 608, shown in Figs. 5 and 7, that extend from the face of the bracket 594. The forward end of the lever 606 is provided with a head 610 which is adapted to contact with a stop lug 612 upon the side of the bull gear 162.

The lug 612 during normal rotation of the bull gear passes under a latch 614, which is pivoted within a horizontal slot formed in the side of a block 618 upon the table 29, and which is urged into engagement with the lug 612 by means of a tension spring 620. The latter is secured thereto at one end and at the other end is secured to a bracket 622 upon the table 29. In order to engage the lugs 612 and thus to stop rotation of the bull gear 162 and at the same time positively to reverse the rotation of the gear and thus to bring the stop 612 into engagement with the latch 614, the lower end of the cylinder 592 is connected to a fluid conduit 624. This conduit is connected at its lower end to a valve 626 having a connection with a suitable source 626a of fluid under compression. The valve is controlled at the moment of stoppage of the drum 26 by means of the cam drum 218 (described later) to actuate the piston 596 and thus to actuate the lever 606 thereby rotating the bull gear 162 in reverse direction upon release of the clutch 50 and actuation of the brake 70, whereby the mechanism including the bull gear 162 is brought to rest. This stoppage of the mechanism results in actuation of the carpenter relay 127 previously referred to. Since there is a slight over-travel of the gear, the lever 606 is now actuated to engage the lug 612 and thus rotate the gear backwardly until it positively engages the latch 614. The lug is thus clamped in position between members 610 and 614.

The mechanism employed for operating the cam drum 218 will now be described. The mechanism comprises a gear 630 shown in Figs. 5 and 7 mounted upon the shaft 39 which drives a sprocket chain 632. This chain, as shown in Fig. 7, extends downwardly through convenient openings within the table 29 and is trained about a gear 634 which is enclosed within the housing 28. The gear is rigidly keyed to a shaft 636 (Fig. 7) having its ends journaled within bearings 638 (Fig. 6) upon flanged edges 640 upon the upper edges of a member of channel like cross-sectional contour 642. The latter member in turn is secured by means of bolts 644 extending through vertical slots 645 in the member 642 and horizontal slots 645a in a standard 646, which is mounted upon the upper surface of the base 27. If desired, a lug 650 may be formed upon the bearing 638 adjacent to the standard 646. This lug 650 is bored and tapped to receive a set screw 652 which projects downwardly and rests at its lower end upon the top of the standard 646 thereby constituting means for adjusting the height of the shaft 636 and thus permitting adjusting of the tension of the chain 632.

The member 642 may also be adjusted in a horizontal plane by means of set screws 656 which extend through horizontal brackets 658 of L-shape that are bolted to the rear face of the standard 646. The ends of these screws bear against the sides of the member 642 in such manner that by rotating the screws in the proper direction the member 642 may be moved forwardly or backwardly at the will of the operator.

The shaft 636 is provided with a gear 654 that in turn engages and drives a second gear 660 of larger diameter, which is keyed upon a shaft 662 having bearings 664 also mounted upon the flanges 640 of the member 642. This shaft 662 is further provided at one extremity thereof with a gear 666, which meshes with and drives a gear 668 upon the corresponding end of a shaft 670 which, like the shafts 662 and 636, is journaled within bearings 672 mounted upon the flange 640. A sprocket gear 674 upon the shaft drives a sprocket chain 676 which is also trained about a second sprocket gear 678. This gear is keyed upon the shaft 278 that supports the cam drum 218, between spaced portions 682 and 684 of the latter. The shaft 278 is supported upon a pair of spaced pedestals 686 which are mounted upon the base 27. The outer extremities of the drum are provided with cam lugs 688 and 690 which respectively engage arms 692 and 694 of elevator door switches 696 and 698. The switch 696 constitutes means for controlling the energization of the solenoids 450 disclosed in Fig. 9 that control the operation of the bead tape gripping cams 369. The switch 698 is interconnected with the magnetic clutch 50 to cause energization of the latter and thus automatically to initiate the rotation of the building drums 26. The electrical connections employed in effecting this purpose will be described later.

As best shown in Fig. 7, the switch 698 is mounted upon a small pedestal 700 upon the base 27. This pedestal is provided with upwardly extending lugs 702 and 704, the latter of which is bored to receive a set screw 706. If desired, shims (not shown) of proper thickness may be placed between the lugs 702 and the switch 698 in such manner that by tightening the set screw 706, the switch may be clamped in any desired position with respect to the cam drum 218, thus providing means for varying the time in the cycle of operations at which the clutch 50 is energized. A plurality of cams 708, 710, 712, 714, 716, 718 and 720 are provided upon the drum 218 at longitudinally and peripherally spaced points for purposes of controlling the opening and closing of the valves 399, 399a, 568, 570, 512, 516 and 626. The valves are mounted upon standards 721 upon the base 27 and are controlled by mechanisms most clearly disclosed in Fig. 7. Since each of the valve controlling devices is identical, only one is described in detail and the description thereof will suffice for all.

Valve controlling rollers 722 contacting with cams 708, 710, 712, 714, 716, 718 and 720 are mounted upon horizontally projecting lugs 724 which are formed upon levers 726. The levers are pivoted upon forwardly projecting brackets 728 which are secured to the upper ends of the standards 721. The rollers 722 are held in contact with the cam drum 218 by means of a tension spring 732, which interconnects a lug 734 upon the upper ends of the standards 721 and a lug 736, which is rigidly secured to the lever 726. The lower extremity of lever 726 contacts with projecting plungers 737 of a valve. All of the valves are identical and are of conventional design. A conventional wiring diagram, illustrating the circuit which controls the operation of the magnetic clutch 50 and the magnetic brake 70 is disclosed in Fig. 8.

Release of the brake shoes 72 and 74 from the drum 70 is effected by energization of the solenoid 78 to retract the plunger further therein. This energization is effected by means of conductors 766 and 768 which are interconnected to opposite ends thereof. The conductor 766 is connected directly to a power line 770, while the conductor 768 is connected to a terminal 772 of a relay switch, indicated generally at 774. A second terminal 776 of this switch is connected to a power line 778 by means of a conductor 780. The conductor 780 is connected to one end of the solenoid 782 of the relay switch 774 by means of a branch 784. The opposite end of this solenoid is connected to a second conductor 785 whereby to establish a return circuit. A plunger 786 extends into this solenoid and supports, at its upper end, a cross arm 788 which serves to bridge the gap between the contact points 772 and 776.

After the solenoid 78 has been deenergized to permit the actuation of the brake shoes 72 and 74 through the agency of the spring 80, it is desirable to retract the shoes in order positively to insure stoppage of the drums 26 at a predetermined point. This energization of the solenoid is effected by means of the carpenter relay switch 127, the contact points 130 and 132 of which are respectively connected to the power line 770 and the conductor 785 by means of conductors 790 and 792.

As previously indicated, stoppage of the brake drum 70 results in a corresponding slowing up of the rotation of the relay drum 126. This slowing of the drum permits the floating member 128 to bridge the gap between the points 130 and 132, thus establishing a circuit through the conductors 790, 792 and 785 to energize the solenoid 782. This energization of the solenoid causes the plunger 786 to rise and thus bridge the gap between the points 772 and 776 whereby to energize the solenoid 78 and thus release the brake drum 70.

The conductor 785 is connected to a contact point 794 of a relay switch, indicated generally at 796 and the second contact point 798 of this switch, in turn, is connected to a conductor 800. A cross arm 802 of this switch, which bridges the gap between the contact points 794 and 798, is supported upon the upper end of a plunger 804, which is actuated by a solenoid 806. The opposite terminals of the latter are respectively connected to the power line 778 and the switch 698 by means of conductors 810 and 812, which serve as means for supplying energizing current to the solenoids.

The conductor 800 extends to a conductor 814 which is attached to a contact point 816 of a relay switch 818. The other contact point 820 of this switch is connected to the power line 770 by means of a conductor 822. The circuit between the points 816 and 820 is closed by means of a cross arm 824 upon a movable plunger 826 in the solenoid 828, which serves as means for actuating the plunger. The conductor 822 is also connected by means of a conductor 830 to a contact point 832 of the switch 698, having a pivoted arm 834, which is normally held from engagement with the point by means of a spring 836. The arm 694 of this switch is actuated by the cam 690 upon the cam drum 218 to close the switch at a predetermined point in the cycle of operation of the machine.

The magnetic clutch 50 comprises a solenoid 842 having a plunger 844 disposed therein and rotatably mounted upon the shaft 62. This plunger is rigidly secured to the disc 46 in such manner that upon energization of the solenoid 842, the face of the disc is brought into engagement with the clutch disc 68 thus causing the disc and the gear associated therewith to rotate with the shaft. One extremity of the solenoid 842 is connected to the conductor 814 by means of a conductor 845 while the other extremity is connected to one contact point 846 of a relay switch 848 by means of a conductor 850. The other contact point 852 of the switch is connected to a conductor 854, which is connected to the power line 778, by means of a branch 856. The switch also comprises an energizing solenoid 858 that actuates a conventional plunger 860 that supports upon its upper end, a cross arm 862 for purposes of bridging the gap between the contact points 846 and 852. The upper extremity of the solenoid 858 is connected to the lower extremity of the conductor 854 while the lower extremity is connected to a conductor 864 leading to the conductor 812. The solenoids 828 and 858 of the switches 818 and 848 are thus connected in parallel for simultaneous operation by means of conductors 866 and 868 which are respectively connected to opposite ends of the solenoid 828 and to the conductors 854 and 864.

Deenergization of the clutch solenoid 842 and the relay switch solenoids 782, 806, 828, and 858 is effected by means of an elevator door switch 116, a terminal 872 of which is connected to the conductor 800 by means of a conductor 874. The arm 876 of this switch is normally held in engagement with the contact point 872 by means of a tension spring 878. The arm is also connected to a contact point 880, which is attached to the conductor 812. The switch arm is actuated by means of the projecting arm 114 of the elevator door switch, which, as previously stated, is operated by means of the cam lug 112 upon the arm 110 shown in Figs. 3, 5 and 8.

In the operation of this circuit, it will be assumed that the clutch 50 is in driving relation and that the shoes of the brake 70 are in disengagement with the brake drum, thus permitting the mechanism of the bead building machine to rotate freely. Under such conditions, the relay switch 774 is closed to complete the circuit to the brake solenoid 78 through the conductors 766, 768 and 780. At the same time, the relay switches 796 and 818 are closed to permit a flow of energizing current through the conductors 822, 814, 800, 785, 784 and 780 to supply electrical energy for maintaining the solenoid 782 of the switch 774 in energized condition, thus maintaining the switch continuously closed. So long as the brake solenoid 78 and the clutch solenoid 842 are energized, the various members of the machine continue to rotate and the disc 126 of the carpenter relay switch, by its frictional drag, maintains the member 128 out of engagement with the contact points 120 and 132.

During this operation of the machine, the solenoid 806 is energized by current flowing through the conductors 822, 814, 874, the elevator door switch 116, the conductor 812 and a return conductor 810. The solenoids of the switches 818 and 848 are also energized through the conductors 854, 866, 856, 868 and 864. This energization of the solenoid of the relay switch 848 also permits a flow of energizing current within the clutch solenoid 842 through the conductors 854, 850, 845, 814 and 822.

When a number of convolutions of bead tape have been wound upon the building drums 26, as determined by the size of the gear 87 operating the gear 104 through the gear 88, the lug 112 engages the arm 114 of the elevator door switch 116 and thus stops the flow of current through the solenoids 806, 828 and 858 of the switches 796, 818 and 848.

Deenergization of these solenoids in turn causes the plungers of the switches to descend, thus opening the circuit which maintains the current through the solenoid 782. Upon deenergization of the latter and resultant breaking of the circuit to the brake solenoid 78, the spring 80 is permitted to operate and thus bring the brake shoes into engagement with the brake drum 70 thus slowing down the rotation of the latter. At the same time, deenergization of the solenoids 828 and 858 breaks the supply circuit for the clutch solenoid 842 and causes the clutch portions to disengage, thus preventing the transmission of power to the driving mechanism of the bead building machine. When the rotation of the brake drum is stopped or almost stopped, the tension of the spring against the member 128 causes the latter to be drawn against the contacts 130 and 132, thus completing a circuit through the conductors 790, 792, and 785, the solenoid 782 and through the conductors 784 and 780. Energization of the solenoid 782 is thus effected to operate the switch 774 and reenergize the solenoid 80 to release the brake 70. Energization of the solenoid 842 and the relay switch solenoids 806, 858 and 828 is effected by the operation of the elevator door switch 698 by means of the cam upon the drum 218. The latter engages the arm 694 of the switch and thus presses the arm 834 into engagement with the contact points 832, thereby restoring a circuit through the conductors 822, 830, 812 and 810 to the solenoid 806 and a circuit from the conductor 812 through the conductors 864, 868, 866, 856 and 854 to the solenoids 828 and 858. Energization of the solenoids 858 and 828 closes the switches 818 and 848 and as soon as this energization is effected, the switch arm 694 is released. However, the energization of the solenoids is maintained by the flow of current through the conductors 822, 814, 874, 812 and 864 and further through the conductors 868, 866 and 854, as previously described.

It will be assumed that in the operation of the machine that the motor 31 is energized while the clutch 50 is deenergized and the brake 70 is released. At this cycle of operation, the drums 26 should be at rest at such positions that the plates 210, 212 and 208 (shown in Fig. 3) upon the member 204 are disposed directly in alignment but out of engagement with the corresponding pins 188 which support the rings 190. The various elements are locked in this position by action of the arm 606 which holds the lug 612 in engagement with the latch 614. When the drums are so disposed, the cam roller 252 engages the member 244, thus raising the clamping portion 242 from the notch 226. This engagement between the member 244 and the roller is maintained through the agency of the bar 257 and the roller 276, shown in Fig. 3, which rests at this time upon the cam 280. During this operation, the cam drum 218 is continuously driven through the agency of the gear 678, chain 676, gears 674, 668, 666, 660, 654, 634, the chain 632, and the sprocket gear 630.

At a predetermined point in the rotation of the drum, the cam 688 engages the arm 692 of the switch 696, thus closing the circuit to the solenoids 450, thereby retracting the arm 442 and the dog 435 to release the cam roller 377 and permitting the arm 376 to descend. This action of the arm rotates the cam 369 to bring it into clamping engagement with the bead tape. Upon a further rotation of the drum 218, the cam 710 operates the valve 399a controlling the admission of fluid under compression to the cylinder 392 to actuate the piston 394 and thus move the slide 348 forwardly to thrust the end of the bead tape under the clamping member 242. At the moment this operation is effected, the cam 280 rotates to such position as to release the cam roller 276 and thus permit the bar 257 to descend to release the roller 252 from engagement with the member 244. Release of the latter causes the member 234 to descend under the actuation of the springs 246 and thus clamp the wire firmly to the drum. The cam 690 now engages the switch arm 694 of the switch 698 to close the circuit controlling the magnetic clutch 50 and to actuate the brake shoes 72 and 74 of the brake mechanism 70.

Simultaneously a cam upon the drum 218 engages the valve mechanism 626 to release the pressure within the cylinder 592 and thus to disengage the lug 610 upon the lever 606 from engagement with the stop lug 612 upon the bull gear 162. The drum mechanism, when so released from the stop arm, is permitted to rotate under the actuating force exerted by the motor, thereby drawing the tape from the source of supply and winding it about the drum. During this winding operation, the roller 542 is maintained in contact with the tape upon the drum for purposes of stitching the latter into position by the admission of fluid under compression to the upper end of the cylinders 537. This admission is effected by the continuous contact of the cam 714 with the corresponding valve 570, which controls the admission of fluid to the conduit 566. After a sufficient length of tape has been wound upon the drum to form a bead of desired strength, the lug 112 is brought into engagement with the arm 114 to break the circuit through the switch 116, thus actuating the brake 70 and the clutch 50 to bring the mechanism for driving the building drums 26 to rest. Since the action of the brake cannot be positive, there is generally a slight over-travel of the building drums so that the clamp 220 does not quite register with the member 331, which guides the end of the bead tape thereto. This over-travel also results in the pins 188 being out of register with respect to the actuating plates 208, 210 and 212. A slight degree of reverse rotation of the drum to bring the stop lug 612 into engagement with the latch 614 is effected by the actuation of the lever 606. This actuation is accomplished by the engagement of the cam 720 with the valve mechanism 626 to admit fluid under compression to the lower end of the cylinder 592, thus to actuate the piston 596 which controls the arm 606. At the moment the mechanism which drives the drums is brought to rest, fluid under compression is admitted to the cylinders 480 to actuate the pistons therein and thus in turn to operate the toggle links 494 which control the levers 496 upon which the shear blades 502 are secured. This operation shears the portion of tape wound upon the drum from the remainder of the tape from the source of supply and at the same time, the movement of the levers 496 causes the rods 590 to descend, thus swinging the ends of the rods 586 downwardly to actuate the latches 578, thereby releasing the lugs of the latter from engagement with the pivoted plates 527. The cam 714 upon the cam drum 218 then engages the valve mechanism 570 to admit fluid under compression to the conduits 566 and thus cause the stitcher rollers 542 to descend and pass along the surface of the drums 26. Slight forward swing of the lower end of the cylinder 537 is permitted by reason of the pivotal mounting of the plate 527 upon which it is mounted. This movement of the rollers along the drum after the latter has stopped effectively stitches the free end of the bead tape 17 into position. After the roller has been retracted, the cam drum 218 by its rotation brings the cam groove 216 into such position that the cam roller 214 is urged forwardly to actuate the collar 198 toward the forming drums 26, thus moving the plates 208, 210 and 212 into engagement with the pins 188 to thrust the ejecting ring forwardly across the surface of the drum and push the freshly formed beads from the latter.

It is thus apparent that the invention comprises a machine in which the various operations of securing the end of a bead tape to the drum, initiating the rotation of the drum, stopping such rotation after a predetermined number of convolutions of wire have been wound thereupon, severing the portion of the tape upon the drum from the source of supply and ejecting the freshly formed beads from the drum are effected automatically in synchronism. The machine so constructed is capable of producing a relatively large number of beads within a comparatively short time and also the manual labor involved in the operation is relatively small. Furthermore, the labor is not of strenuous character since at most it merely involves the simple operation of receiving the beads as they are ejected from the machine and applying tapes thereto to secure the ends and the necessary attention to insure that the machine is properly cared for and that bead tape is supplied thereto. This type of labor manifestly is so simple in character that it may be performed by relatively unskilled operators who may be procured at but slight expense.

Although I have illustrated the preferred form of the invention and have described that form in detail, it will be apparent to those skilled in the art that the invention is not so limited but that various modifications may be made therein without departing from the spirit of the invention or from the scope of the appended claims.

What I claim is:

1. A machine for building bead units for pneumatic tires comprising a rotatable drum, a spring pressed ring disposed about the drum, and means for reciprocating the ring longitudinally of the drum against the action of the springs for purposes of ejecting bead units therefrom.

2. A machine for manufacturing bead units for pneumatic tires comprising a drum, a spring-pressed clamp for engaging the end of bead wire to be secured to the drum, an operating device projecting from the clamp, means for rotating the drum, means for stopping rotation after a predetermined number of revolutions, and means for engaging the operating device to release the clamp upon stoppage of the drum.

3. A machine for manufacturing bead units for pneumatic tires comprising a drum upon which bead wire is wound, a means for engaging the end of the wire and securing it to the surface of the drum, means for rotating the drum, means for stopping the rotation after a predetermined number of revolutions, means for releasing the securing means upon stoppage of the drum, and means operable after the release of the securing means for ejecting a bead unit from the drum.

4. A machine for manufacturing bead units for pneumatic tires comprising a drum upon which bead wire is wound, a clamp for engaging the end of the wire and securing it to the surface of the drum, means for rotating the drum, means for stopping the rotation after a predetermined number of revolutions, means for releasing the clamp upon stoppage of the drum, and means for ejecting the bead unit longitudinally from the drum.

5. A machine for manufacturing bead units for pneumatic tires comprising a drum upon which bead wire is wound, means for engaging the end of the wire and securing it to the surface of the drum, means for rotating the drum, means for stopping the rotation after a predetermined number of revolutions, means for releasing the securing means upon stoppage of the drum, and means for ejecting the bead unit longitudinally from the drum, said means comprising a ring having means to reciprocate it longitudinally of the drum.

6. A machine for constructing bead units for pneumatic tires comprising a drum, means associated with the drum for securing the end of a bead tape to the surface of the latter, means for rotating the drum, means for stopping rotation after a predetermined number of revolutions, means for operating the securing means to release the bead unit upon stoppage of the drum and for holding the securing means released during such stoppage, and means for thrusting the end of a bead tape under the securing means while the drum is at rest.

7. A machine for manufacturing bead units for pneumatic tires comprising a drum, means for rotating the drum, means for stopping rotation of the drum, means for automatically securing the end of a bead tape to the drum, means for automatically releasing the end of the tape upon stoppage of the drum, means for severing the bead tape upon stoppage of the drum, and means for thrusting the initial end of the severed bead tape under the securing means.

8. A machine for manufacturing bead units for pneumatic tires comprising a drum, means for rotating the drum, means for stopping rotation of the drum, means for automatically securing the end of a bead tape to the drum, means for automatically releasing the end of the tape upon stoppage of the drum, means for severing the bead tape upon stoppage of the drum, means for thrusting the initial end of the severed bead tape under the securing means, and means for automatically synchronously operating said previously mentioned means.

9. A machine for constructing bead units for pneumatic tires comprising a drum, means for rotating the drum, means for stopping rotation after a predetermined number of revolutions, means for severing a strip of bead tape after stoppage of the drum, and means for thrusting the severed initial end of the bead tape into engagement with the drum after operation of the severing means.

10. A machine for constructing bead units for pneumatic tires comprising a drum, means for rotating the drum, means for stopping the drum after a predetermined number of revolutions, means for securing bead tape to the drum, means for releasing the securing means upon stoppage of the drum after a predetermined number of revolutions, means for severing the tape upon stoppage of the drum, means for ejecting a freshly formed bead unit from the drum, and means for thrusting the initial end of the severed tape under the securing means.

11. A machine for constructing bead units for pneumatic tires comprising a drum, means for rotating the drum, means for stopping the drum after a predetermined number of revolutions, means for securing bead tape to the drum, means for releasing the securing means upon stoppage of the drum after a predetermined number of revolutions, means for severing the tape upon stoppage of the drum, means for ejecting a freshly formed bead unit from the drum, means for thrusting the initial end of the severed tape under the securing means, and means for automatically synchronizing the operation of the drum and the previously defined means.

12. A machine for constructing bead units for pneumatic tires comprising a drum, means for rotating the drum, means for stopping the rotation of the drum after a predetermined number of revolutions, stitching means normally engaging the surface of the drum for stitching bead wire to the latter, and means for causing the stitching means to travel a short distance along the surface of the drum after stoppage of the latter.

13. A machine for constructing bead units for pneumatic tires comprising a drum, means for rotating the drum, means for stopping rotation of the drum after a predetermined number of revolutions, said means comprising a clutch for releasing the drum from engagement with the means after rotation thereof, a brake for overcoming the kinetic inertia of the drum, and means for positively bringing the drum to rest at a predetermined point in its cycle of revolution, said last named means automatically reversing the rotation of the drum in case of over travel.

14. A machine for constructing bead units for pneumatic tires comprising a drum and means for rotating the drum, means for stopping rotation of the drum, and means automatically for reversing the rotation of the drum in case of over travel to bring it to rest at a predetermined point in its cycle of operation.

15. A machine for constructing beads for pneumatic tires comprising a drum, means for rotating the drum, means for stopping rotation of the drum, means for causing reverse rotation of the drum in order positively to secure stoppage at a predetermined point in its cycle of revolution, and means for releasing the stopping means during such reverse revolution.

16. A machine for constructing bead units for pneumatic tires comprising a drum, means for rotating the drum, means for stopping rotation of the drum, means for automatically operating the stopping means after a predetermined number of revolutions of the drum, and means for automatically ejecting bead units from the drum.

17. A machine for constructing bead units for pneumatic tires comprising a drum, means for rotating the drum, a brake for stopping rotation of the drum, means for automatically operating the brake after a predetermined number of revolutions of the drum, and means for automatically ejecting bead units longitudinally of the drum.

18. A machine for constructing bead units for pneumatic tires comprising a drum, means for rotating the drum, means for stopping rotation of the drum, means for automatically operating the stopping means after a predetermined number of revolutions of the drum, and means for automatically ejecting bead units longitudinally of the drum, said means comprising a ring mounted upon the drum and means for reciprocating the ring longitudinally thereof.

19. A machine for manufacturing bead units for pneumatic tires comprising a drum, means for rotating the drum, a brake for stopping rotation of the drum, a clutch for releasing the brake from the means for imparting rotational movement thereto, means for automatically reversing the direction of rotation of the drum in case of over-travel when the brake is operated, and means for automatically and synchronously operating the previously described means.

20. A machine for constructing bead units for pneumatic tires comprising a drum, means for rotating the drum, a brake for stopping rotation of the drum, a clutch for releasing the drum from the means for rotation thereof, and means for ejecting bead units longitudinally from the drum upon stoppage of the latter.

21. A machine for constructing bead units for pneumatic tires comprising a drum, means for rotating the drum, a brake for stopping rotation of the drum, a clutch for releasing the drum from the means for rotation thereof, means for ejecting bead units longitudinally from the drum upon stoppage of the latter, and means for automatically and synchronously operating the previously described means.

22. A machine for constructing bead units for pneumatic tires comprising a drum, means for rotating the drum, a brake for stopping rotation thereof, a clutch for releasing the drum from the means for rotating it, means for reversing the rotation of the drum in case of over-travel of the latter after the application of the brake, and means for ejecting bead units from the drum.

23. A machine for constructing bead units for pneumatic tires comprising a drum, means for rotating the drum, a brake for stopping rotation thereof, a clutch for releasing the drum from the means for rotating it, means for reversing the rotation of the drum in case of over-travel of the latter after the application of the brake, means for ejecting bead units from the drum, and means for automatically and synchronously operating each of the previously described means.

24. A machine for constructing bead units for pneumatic tires comprising a drum, means for rotating the drum, brake means for stopping rotation of the drum, means operable upon operation of the brake for releasing the drum from the means for rotating it, and means for thrusting the end of a bead tape into engagement with the drum upon stoppage of the latter.

25. A machine for constructing bead units for pneumatic tires comprising a drum, means for rotating the drum, brake means for stopping rotation of the drum, means operable upon operation of the brake for releasing the drum from the means for rotating it, means for thrusting the end of a bead tape into engagement with the drum upon stoppage of the latter, and additional means for automatically and synchronously operating the previously described means.

26. A machine for manufacturing bead units for pneumatic tires comprising a drum, means for rotating the drum, means for stopping rotation of the drum, means for releasing the drum from the means for rotating it, means for ejecting a bead unit from the drum, and means for thrusting the end of a bead tape into engagement with the surface of the drum.

27. A machine for manufacturing bead units for pneumatic tires comprising a drum, means for rotating the drum, means for stopping rotation of the drum, means for releasing the drum from the means for rotating it, means for ejecting a bead unit from the drum, means for thrusting the end of a bead tape into engagement with the surface of the drum, and means interconnecting the previously described means for automatically and synchronously operating the previously described means.

28. A machine for constructing bead units for pneumatic tires comprising a drum, means for rotating the drum, means for stopping rotation of the drum, means for releasing the drum from the means for rotating it, means for causing a slight degree of reverse rotation of the drum in case of over-travel of the latter after the brake is applied, means for ejecting bead units from the drum, and means for thrusting the end of a bead tape into engagement with the drum.

29. A machine for constructing bead units for pneumatic tires comprising a drum, means for rotating the drum, means for stopping rotation of the drum, means for releasing the drum from the means for rotating it, means for causing a slight degree of reverse rotation of the drum in case of over-travel of the latter after the brake is applied, means for ejecting bead units from the drum, means for thrusting the end of a bead tape into engagement with the drum, and means for automatically and synchronously operating each of the previously described means.

30. A machine for constructing bead units for pneumatic tires comprising a drum, means for rotating the drum, means for stopping rotation of the drum, means for releasing the drum from the means for rotating it, means for imparting a slight degree of reverse rotation to the drum in case of over-travel after the application of the means for stopping it, means for cutting bead tape, means for ejecting a bead unit from the drum, and means for thrusting the initial end of the cut tape into engagement with the drum.

31. A machine for constructing bead units for pneumatic tires comprising a drum, means for rotating the drum, means for stopping rotation of the drum, means for releasing the drum from the means for rotating it, means for imparting a slight degree of reverse rotation to the drum in case of over-travel after the application of the means for stopping it, means for ejecting a bead unit from the drum, means for thrusting the end of a bead tape into engagement with the drum, means for cutting bead tape, and means associated with the previously described means for automatically and synchronously operating the latter.

32. A machine for constructing bead units for pneumatic tires comprising a drum, means for rotating the drum, means for stopping rotation of the drum, means for releasing the drum from the means for rotating it, means for causing a slight degree of reverse rotation of the drum in case of over-travel after application of the means for stopping it, means for stitching bead tape to the drum, means for cutting the tape, and means for thrusting the initial end of the cut tape into engagement with the drum, each of the previously described means being operated automatically and successively.

33. A machine for constructing bead units for pneumatic tires comprising a drum, means for rotating the drum, means for stopping rotation of the drum, means for releasing the drum from the means for rotating it, means for causing reverse rotation of the drum in case of over-travel, means for severing a bead tape, means for stitching the free end of the severed piece of bead tape to the drum after stoppage of rotation of the latter, means for ejecting bead units from the drum, and means for automatically and successively operating each of the previously described means.

34. A machine for constructing bead units for pneumatic tires comprising a drum, means for rotating the drum, and means for applying fluid to the surface of the drum.

35. A machine for constructing bead units for pneumatic tires comprising a drum, means for rotating the drum, means for applying a non-adhesive fluid to the surface of the drum, and means for ejecting bead units longitudinally from the surface of the drum.

36. A machine for constructing bead units for pneumatic tires comprising a drum, means for rotating the drum, means for applying non-adhesive fluid to the surface of the drum, means for ejecting bead units longitudinally from the drum, and means for bringing the end of a bead tape into engagement with the drum.

37. In a machine for building a bead unit for a pneumatic tire, in combination, a rotatable bead wire receiving drum, an axially movable ring on said drum, means arranged adjacent the outer periphery of the drum for moving the ring axially to push the bead unit from the drum, and resilient means instantly returning the ring to its original position.

38. In a machine for building a bead unit for a pneumatic tire, in combination, a rotatable drum, means associated with the drum for securing the initial end of bead wire thereto, means for automatically raising said securing means whereby the bead wire may be passed thereunder, and means for automatically thrusting the initial end of the bead wire under said securing means.

39. In a machine for building a bead unit for a pneumatic tire, in combination, a rotatable drum, means associated with the drum for securing the initial end of bead wire thereto, means for raising said securing means whereby the bead wire may be passed thereunder, means for thrusting the initial end of the bead wire under said securing means, means for lowering said securing means to hold the wire in place, and means automatically and synchronously operating said raising, thrusting and lowering means.

40. In a machine for building a bead unit for a pneumatic tire, in combination, a rotatable drum, means associated with the drum for securing the initial end of bead wire thereto, automatic means for thrusting the end of the wire under the securing means, and additional means engaging the wire and having a normal tendency to prevent retraction of the wire.

41. In a machine for building a bead unit for a pneumatic tire, in combination, a rotatable drum, means associated with the drum for securing the initial end of bead wire thereto, automatic means for thrusting the end of the wire under the securing means, and a pair of rollers between which the wire passes, one of the rollers having a normal bias toward the other whereby any tendency of the wire to retract will move the biased roller toward the other to prevent such retraction.

42. In a machine for building a bead unit for a pneumatic tire, in combination, a rotatable drum, means associated with the drum for securing the initial end of bead wire thereto, means for raising said securing means whereby the bead wire may be passed thereunder, means for thrusting the initial end of the bead wire under said securing means, means for lowering said securing means to hold the wire in place, means automatically and synchronously operating said raising, thrusting and lowering means, and additional means engaging the wire and having a normal tendency to prevent retraction of the wire.

43. In a machine for building a bead unit for a pneumatic tire, in combination, a drum, means for securing the initial end of bead wire to the drum, means for preventing retraction of the wire from the securing means, means for rotating the drum, means for stopping rotation after a predetermined number of revolutions, means for severing the wire after stoppage of the drum, and means for thrusting the initial end of the severed wire into engagement with the securing means after operation of the severing means.

44. In a machine for building a bead unit for a pneumatic tire, in combination, a drum, means for securing the initial end of a bead wire to the drum, mechanism for feeding the bead wire to the securing means, means for rotating the drum, means for stopping the drum, and means for insuring stoppage of the drum at a point where said securing means is in alinement with said feeding mechanism.

45. In a machine for building a bead unit for a pneumatic tire, in combination, a drum, means for securing the initial end of bead wire to the drum, means for feeding the bead wire to the securing means, means for preventing retraction of the wire, means for rotating the drum, means for stopping the drum, and mechanism insuring stoppage of the drum at a point where said securing means is in alinement with said feeding means, said mechanism including means for reversing the rotation of the drum in case of over travel.

46. In a machine for building a bead unit for a pneumatic tire, in combination, a drum, means for securing the initial end of bead wire to the drum, mechanism for feeding the bead wire to the securing means, means for rotating the drum, means for stopping the drum, means insuring stoppage of the drum at a point where said securing means is in alinement with said feeding mechanism, and means automatically and synchronously operating said previously mentioned means and mechanism.

GEORGE G. ANDREWS.